United States Patent
Higuchi et al.

(10) Patent No.: US 7,406,376 B2
(45) Date of Patent: Jul. 29, 2008

(54) PASSIVE SAFETY SYSTEM AND DETERMINATION DEVICE

(75) Inventors: Hiroshi Higuchi, Kariya (JP); Seiya Ide, Okazaki (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 11/016,893

(22) Filed: Dec. 21, 2004

(65) Prior Publication Data

US 2005/0161920 A1 Jul. 28, 2005

(30) Foreign Application Priority Data

Jan. 28, 2004 (JP) ............................. 2004-020537

(51) Int. Cl.
*B60R 21/0134* (2006.01)
*B60R 21/16* (2006.01)

(52) U.S. Cl. .................... 701/47; 280/735; 180/282; 340/436

(58) Field of Classification Search ................. None
See application file for complete search history.

(56) References Cited

U.S. PATENT DOCUMENTS

| 5,073,860 | A | * | 12/1991 | Blackburn et al. | ............. | 701/47 |
| 5,337,238 | A | * | 8/1994 | Gioutsos et al. | ............... | 701/47 |
| 5,436,838 | A | * | 7/1995 | Miyamori | ..................... | 701/46 |
| 5,531,122 | A | * | 7/1996 | Chatham et al. | .............. | 73/760 |
| 5,758,301 | A | * | 5/1998 | Saito et al. | ..................... | 701/45 |
| 5,801,619 | A | * | 9/1998 | Liu et al. | ..................... | 340/436 |
| 5,884,203 | A | * | 3/1999 | Ross | ............................ | 701/45 |
| 5,899,948 | A | * | 5/1999 | Raphael et al. | ................ | 701/45 |
| 5,904,730 | A | * | 5/1999 | Yamazaki et al. | ............ | 701/301 |
| 6,061,616 | A | * | 5/2000 | Ohno et al. | .................... | 701/45 |
| 6,167,335 | A | | 12/2000 | Ide et al. | | |
| 6,203,060 | B1 | * | 3/2001 | Cech et al. | .................. | 280/735 |
| 6,236,922 | B1 | * | 5/2001 | Andres | ......................... | 701/45 |
| 6,272,412 | B1 | * | 8/2001 | Wu et al. | ....................... | 701/47 |
| 6,329,910 | B1 | * | 12/2001 | Farrington | .................. | 340/436 |
| 6,487,482 | B1 | * | 11/2002 | Mattes et al. | ................ | 701/45 |
| 6,644,688 | B1 | * | 11/2003 | Hu et al. | ..................... | 280/735 |

(Continued)

FOREIGN PATENT DOCUMENTS

EP 0 517 253 A1 12/1992

(Continued)

OTHER PUBLICATIONS

Canadian Office Action dated May 30, 2007 in corresponding Canadian application No. 2,492,643.

(Continued)

*Primary Examiner*—Jack W Keith
*Assistant Examiner*—Ari M Diacou
(74) *Attorney, Agent, or Firm*—Posz Law Group, PLC

(57) ABSTRACT

A determination device includes a single acceleration sensor for measuring an acceleration of a vehicle and a determination circuit for determining severity of a collision in an accident. A plastic deformation pulse detection section and an elastic deformation pulse detection section of the determination circuit detect a plastic deformation pulse and an elastic deformation pulse, respectively, from a waveform of measured accelerations. A severity determination section of the detection circuit determines the severity of a collision based on a correlation between a vehicle speed and a plastic deformation pulse, and a correlation between the vehicle speed, the plastic deformation pulse, and an elastic deformation pulse.

6 Claims, 9 Drawing Sheets

U.S. PATENT DOCUMENTS

| | | | |
|---|---|---|---|
| 6,721,642 B1 * | 4/2004 | Wu et al. | 701/45 |
| 6,832,145 B2 * | 12/2004 | Takafuji et al. | 701/45 |
| 6,882,916 B2 * | 4/2005 | Takafuji et al. | 701/45 |
| 2002/0188393 A1 * | 12/2002 | Yokota et al. | 701/45 |
| 2003/0020266 A1 * | 1/2003 | Vendely et al. | 280/739 |
| 2003/0128923 A1 * | 7/2003 | Takiguchi et al. | 416/17 |
| 2004/0034458 A1 * | 2/2004 | Erb | 701/45 |
| 2004/0210367 A1 * | 10/2004 | Takafuji et al. | 701/45 |
| 2005/0021191 A1 * | 1/2005 | Takafuji et al. | 701/1 |
| 2005/0065665 A1 * | 3/2005 | Mae | 701/1 |
| 2006/0109104 A1 * | 5/2006 | Kevaler | 340/531 |
| 2006/0167603 A1 * | 7/2006 | Brandl et al. | 701/45 |

FOREIGN PATENT DOCUMENTS

| | | |
|---|---|---|
| EP | 1 000 820 A2 | 5/2000 |
| GB | 2 340 978 A | 12/1998 |
| GB | 2 410 594 | 8/2005 |

OTHER PUBLICATIONS

Examination Report from Great Britain Patent Office issued on Apr. 13, 2006 for the corresponding Great Britain patent application No. GB0500490.8.

* cited by examiner

PASSIVE SAFETY SYSTEM AND DETERMINATION DEVICE

CROSS REFERENCE TO RELATED APPLICATION

This application is based on and incorporates herein by reference Japanese Patent Application No. 2004-20537 filed on Jan. 28, 2004.

FIELD OF THE INVENTION

The present invention relates to a passive safety system for protecting an occupant of a vehicle against injury, and a determination device included in the passive safety system.

BACKGROUND OF THE INVENTION

A determination device for a passive safety system is proposed in JP-A-11-194137. In the passive safety system, an airbag is inflated in two steps using a satellite sensor and a floor G sensor. The satellite sensor is disposed at the front part of a vehicle and the floor G sensor is disposed in an electronic control unit ECU that is located under the instrument panel above the floor tunnel. The airbag system includes two inflators. The determination device detects the difference in phase between two acceleration waveforms obtained from the satellite sensor and the floor G sensor. Then, the determination device determines the severity of collision based on the detected phase difference. Both of two inflators in the airbag system are actuated if the severity is high, that is, the accident is serious. The airbag is inflated at a high pressure when both inflators are actuated and therefore an impact of the collision on the occupant is reduced.

The occupants may receive excessive impact from the airbag inflated at the high pressure if the severity is low, that is, the accident is not serious. When the severity is determined as low, only one of the two inflators is actuated to inflate the airbag at a low pressure. As a result, the impact of the airbag on the occupant is reduced.

However, the determination device of the proposed passive safety system requires two kinds of sensors: a satellite sensor and a floor G sensor. If a malfunction occurs in one of the sensors, the severity may not be properly determined.

SUMMARY OF THE INVENTION

The present invention therefore has an objective to provide a passive safety system having a determination device that determines the severity of collision based on an acceleration waveform produced by a single acceleration sensor. The determination device produces information necessary for driving a passive safety device according to the severity of collision.

The determination device includes a single acceleration sensor and a determination circuit. The acceleration sensor measures an acceleration of a vehicle. The determination circuit has a plastic deformation pulse detection circuit, an elastic deformation pulse detection circuit, and a severity determination circuit. The plastic deformation pulse detection circuit is electrically connected with the acceleration sensor.

The plastic deformation pulse detection circuit detects a plastic deformation pulse from an acceleration waveform obtained through the acceleration measurement. The elastic deformation pulse detection circuit that detects an elastic deformation pulse from the acceleration waveform. The severity determination circuit determines the severity of a collision based on a vehicle speed, and the plastic deformation pulse, and the elastic deformation pulse. The plastic deformation pulse has a correlation to a vehicle speed. An appearance of peak in the plastic deformation pulse with respect to the elastic deformation pulse has a correlation with a vehicle speed. Therefore, the severity determination section determines the severity of the collision based on such correlations.

With this configuration, the determination device can determine the severity of collision based on the acceleration waveform produced only by a single sensor. Thus, the severity determination is reliably performed.

DETAILED DESCRIPTION OF THE PREFERRED EMBODIMENT

The preferred embodiments of the present invention will be explained with reference to the accompanying drawings.

Severity of a collision in an accident becomes higher as a speed of a vehicle, which is a relative speed of a vehicle to an object, increase and the severity becomes lower as the speed of the vehicle decrease. Namely, the severity of a collision can be determined based on an acceleration waveform produced by an acceleration sensor.

Figure 1:
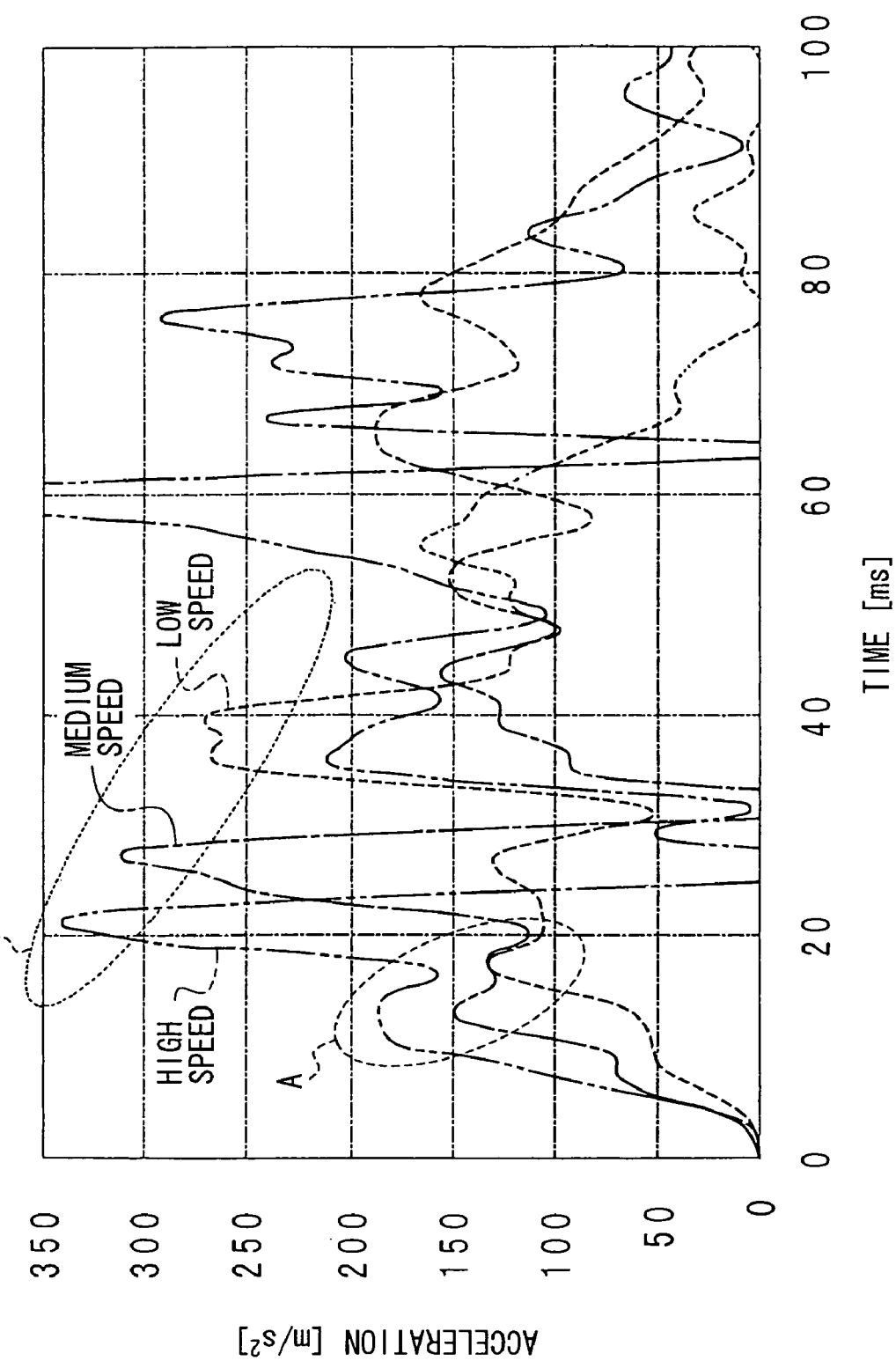
FIG. 1 is a graph showing acceleration waveforms according to an embodiment of the present invention.

Examples of high speed (30-35mph), medium speed (20-23mph), and low seed (under 16mph) acceleration waveforms are shown in FIG. 1. Peaks that indicate a structural characteristic of a vehicle appears in each waveform. The peaks in dashed-line circle A and the peaks in dashed-line circle B are referred to as the first peaks and the second peaks, respectively. Heights of the first peaks and the second peaks increase as a vehicle speed increases. The peak of the medium speed waveform is higher than that of the low speed waveform and the peak of the high speed waveform is higher than that of the medium speed waveform. Therefore, a level of the speed, namely, the severity can be determined based on the amplitude of the peaks.

However, the acceleration waveforms produced at a vehicle collision are different from vehicle to vehicle even among the same model of vehicles. The severity determination is usually performed in consideration of such variations. For example, a variation of ±10% is taken into consideration for determining the severity based on the acceleration waveform. The passive safety device is operated at a low severity level when the vehicle speed is relatively low. In the case of an airbag system, an airbag is inflated at a low pressure when the vehicle speed is low.

More specifically, only one inflator is actuated to inflate the airbag at low pressure. Another inflator is actuated when a certain period has elapsed so that an occupant will not receive an excessive impact from the airbag. A safety margin of 10% is provided against the acceleration waveform and the acceleration waveform having 110% of the measured acceleration waveform amplitudes is used in the severity determination. Therefore, the passive safety device is properly operated.

The passive safety device is operated at a high severity level when the vehicle speed is relatively high. When the speed of the vehicle is the medium speed or higher, the both inflators are simultaneously actuated to inflate the airbag at a high pressure. A safety margin of 10% is provided against the acceleration waveform and the acceleration waveform having 90% of the measured acceleration waveform amplitudes is used in the severity determination. Therefore, the passive safety device is properly operated.

Figure 2:
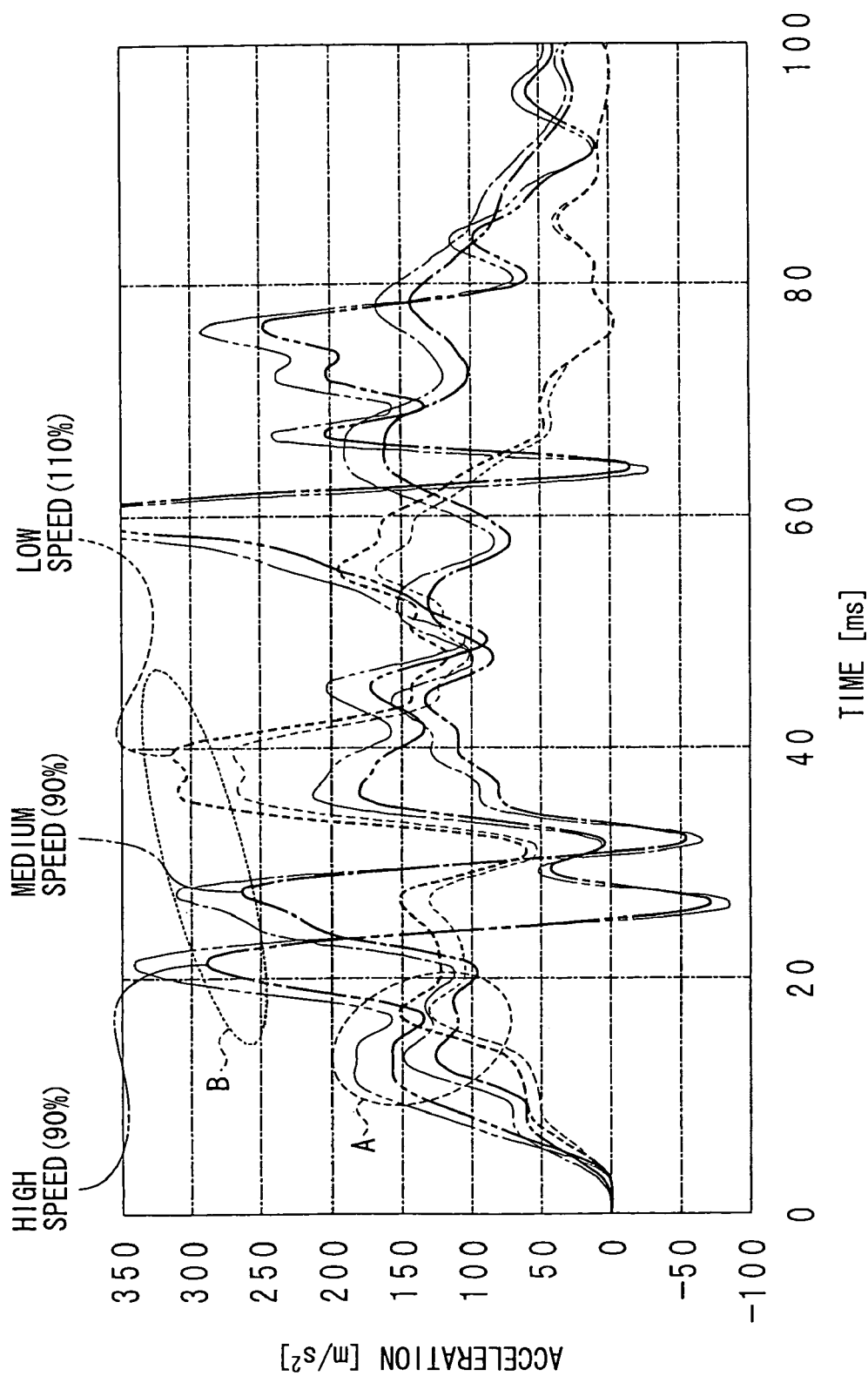
FIG. 2 is a graph showing the acceleration waveforms with 10% safety margins according to the embodiment.

The high speed and the medium speed acceleration waveforms having 90% of the measured acceleration waveform amplitude and the low speed acceleration waveform having 110% of the measured acceleration waveform amplitude are shown in FIG. 2. The corresponding measured waveforms shown in FIG. 1 are also include in FIG. 2 and indicated fine lines. The X axis is a time scale and the Y axis is an acceleration, or deceleration, scale. A peak indicated with a dashed-line circle appears in each waveform. The peak of the medium speed waveform (90% amplitude waveform) is higher than that of the high speed waveform (90% amplitude waveform). The peak of the high speed waveform (90% amplitude waveform) is higher than that of the medium speed waveform (90% amplitude waveform). The amplitudes of the first and the second peaks are not proportional to the vehicle speeds when the variations are taken into consideration.

It is assumed that the acceleration waveform contains an elastic deformation pulse related to damage to the entire vehicle and a plastic deformation pulse related to damage to individual parts of the vehicle. Based on this assumption, the severity can be accurately determined based on the plastic deformation pulse. Thus, the plastic deformation pulse is separated from the acceleration waveform.

Figure 3:
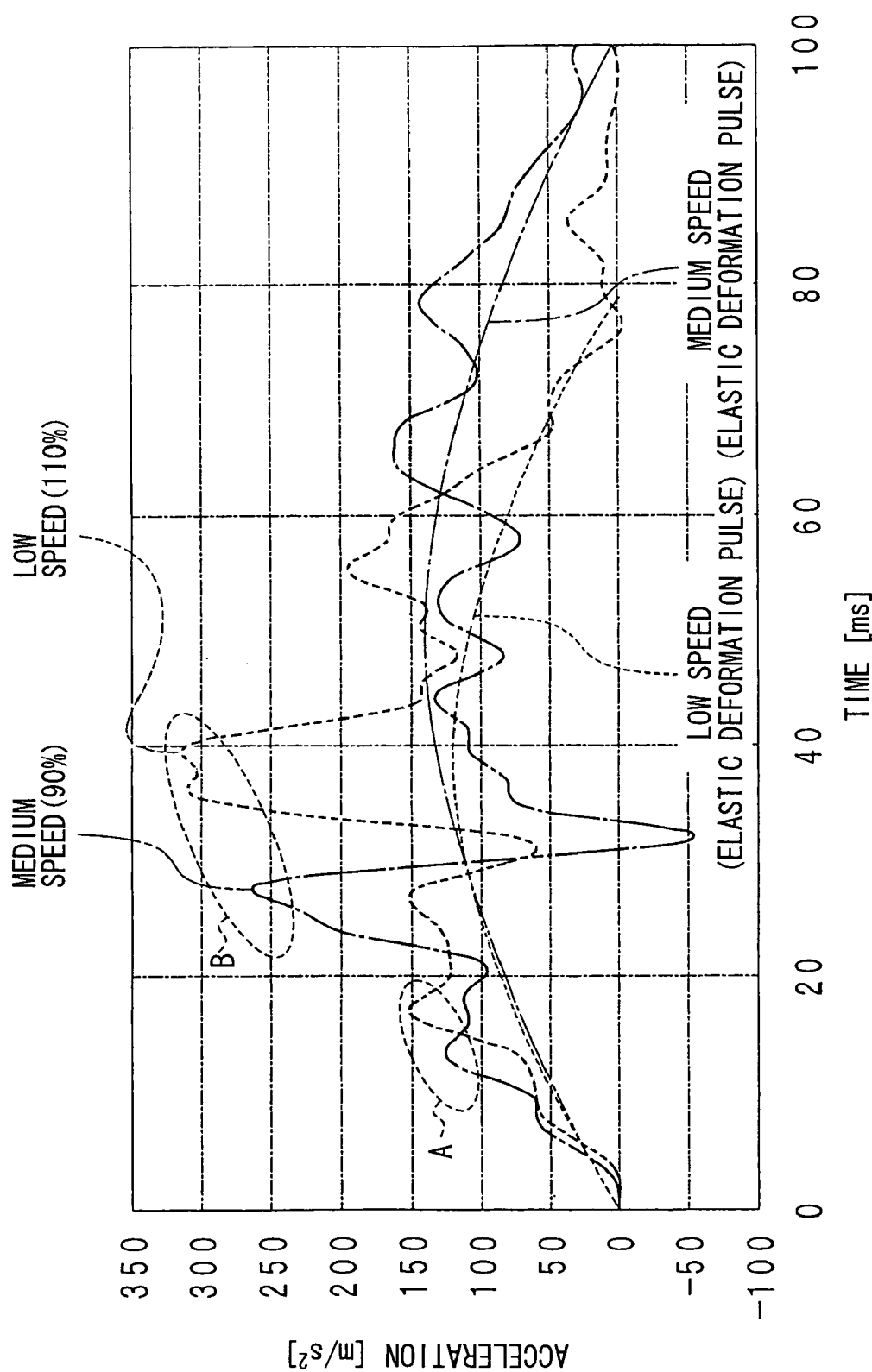
FIG. 3 is a graph showing the acceleration waveforms with 10% safety margins and elastic deformation pulses according to the embodiment.
Figure 4A:
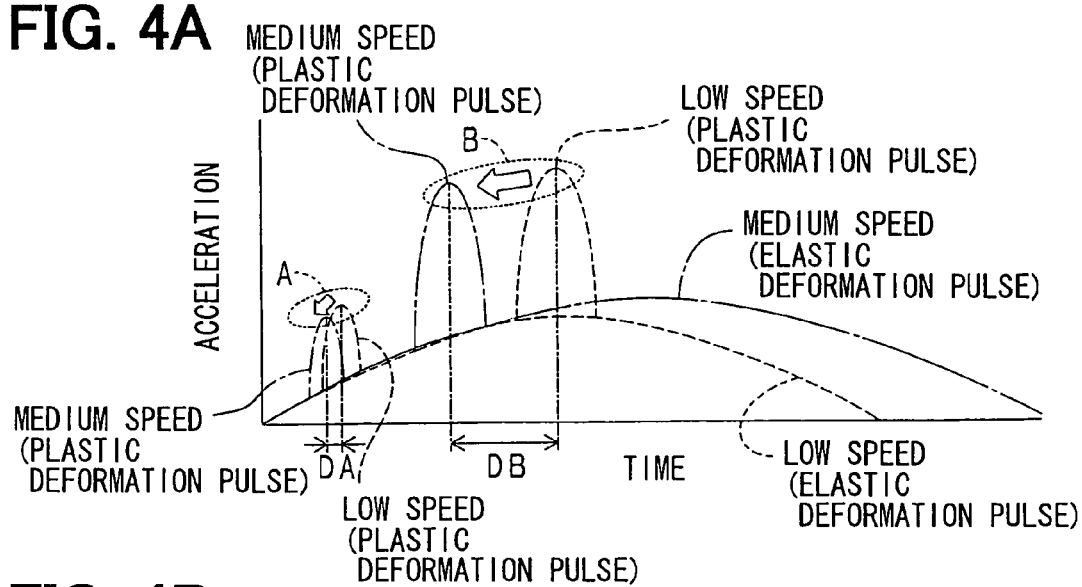
FIG. 4A is a schematic diagram of the acceleration waveforms shown in FIG. 3 according to the embodiment.

The medium speed acceleration waveform, the low speed acceleration waveform, the elastic deformation pulse, and the plastic deformation pulse are shown in FIG. 3. The elastic deformation pulse is a long-period, low-frequency pulse, a half period of which is equal to the whole period of a collision. The elastic deformation pulses and the plastic deformation pulses contained in the low speed and the medium speed acceleration waveforms are schematically illustrated in FIG. 4A. Each of the low speed acceleration waveform and medium speed acceleration waveform contain the elastic deformation pulse and the plastic deformation pulse.

The first peak of the medium speed acceleration waveform appears earlier than that of the low speed acceleration waveform with respect to the elastic deformation pulse of each acceleration waveform. The second peak of the medium speed acceleration waveform also appears earlier than that of the low speed acceleration waveform with respect to the elastic deformation pulse of each acceleration waveform. Namely, the appearance of the first and the second peak with respect to the elastic deformation pulse is proportional to the vehicle speed. However, the first and second peaks of the low speed acceleration waveform are higher than those of the medium speed acceleration waveform. Namely, the levels of the peaks (elastic deformation pulse+plastic deformation pulse) are not proportional to the vehicle speed.

Figure 4B:
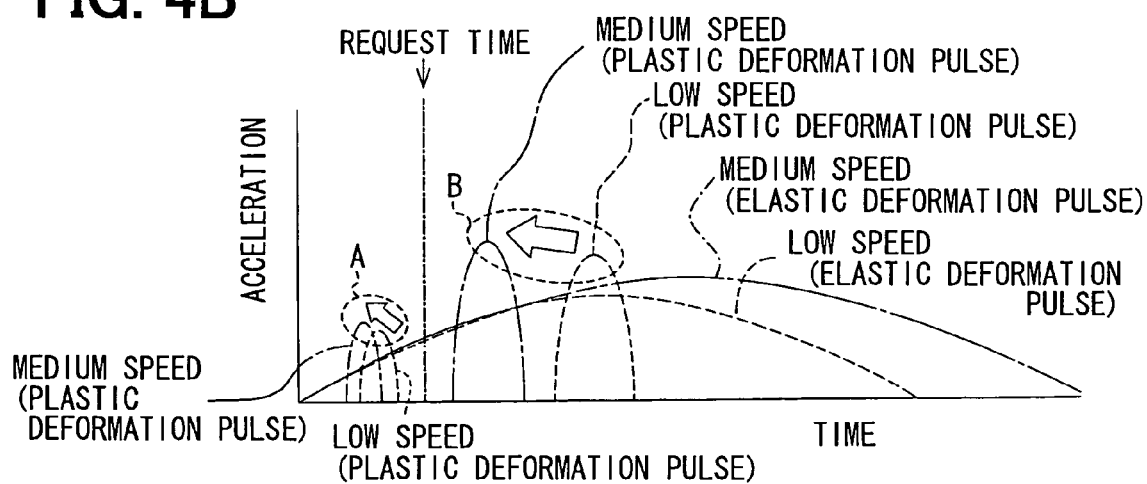
FIG. 4B is a schematic diagram of the elastic deformation pulses and plastic deformation pulsed contained in the acceleration waveforms shown in FIG. 4A according to the embodiment.

The plastic deformation pulse is separated from the acceleration waveform. The peak of the medium speed acceleration waveform becomes higher than that of the low speed acceleration waveform as shown in FIG. 4B when the plastic deformation pulses are compared. Namely, the levels of the peaks of the plastic deformation pulses are proportional to the vehicle speed.

Figure 7:
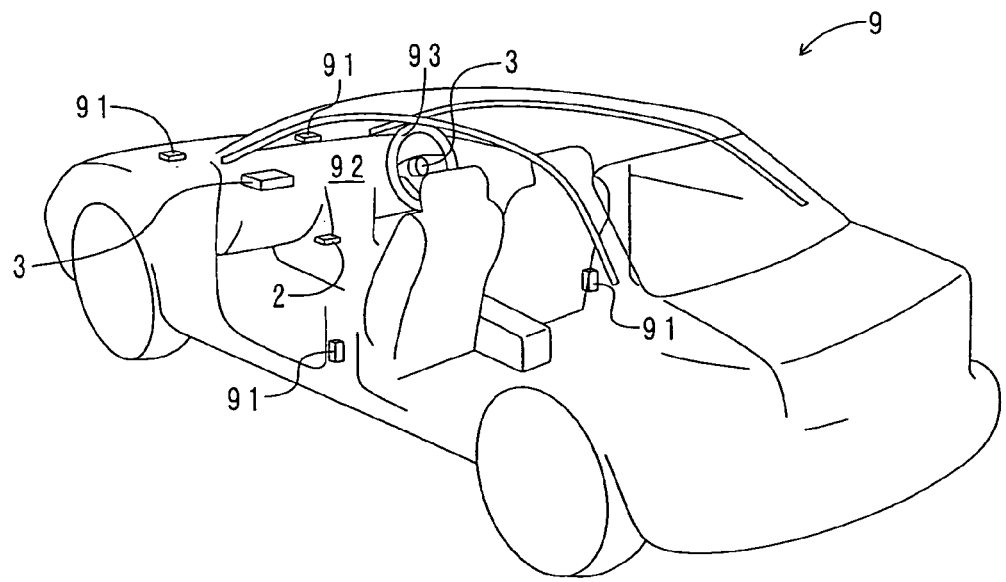
FIG. 7 is a perspective view of a vehicle with a passive safety system according to the embodiment.
Figure 8:
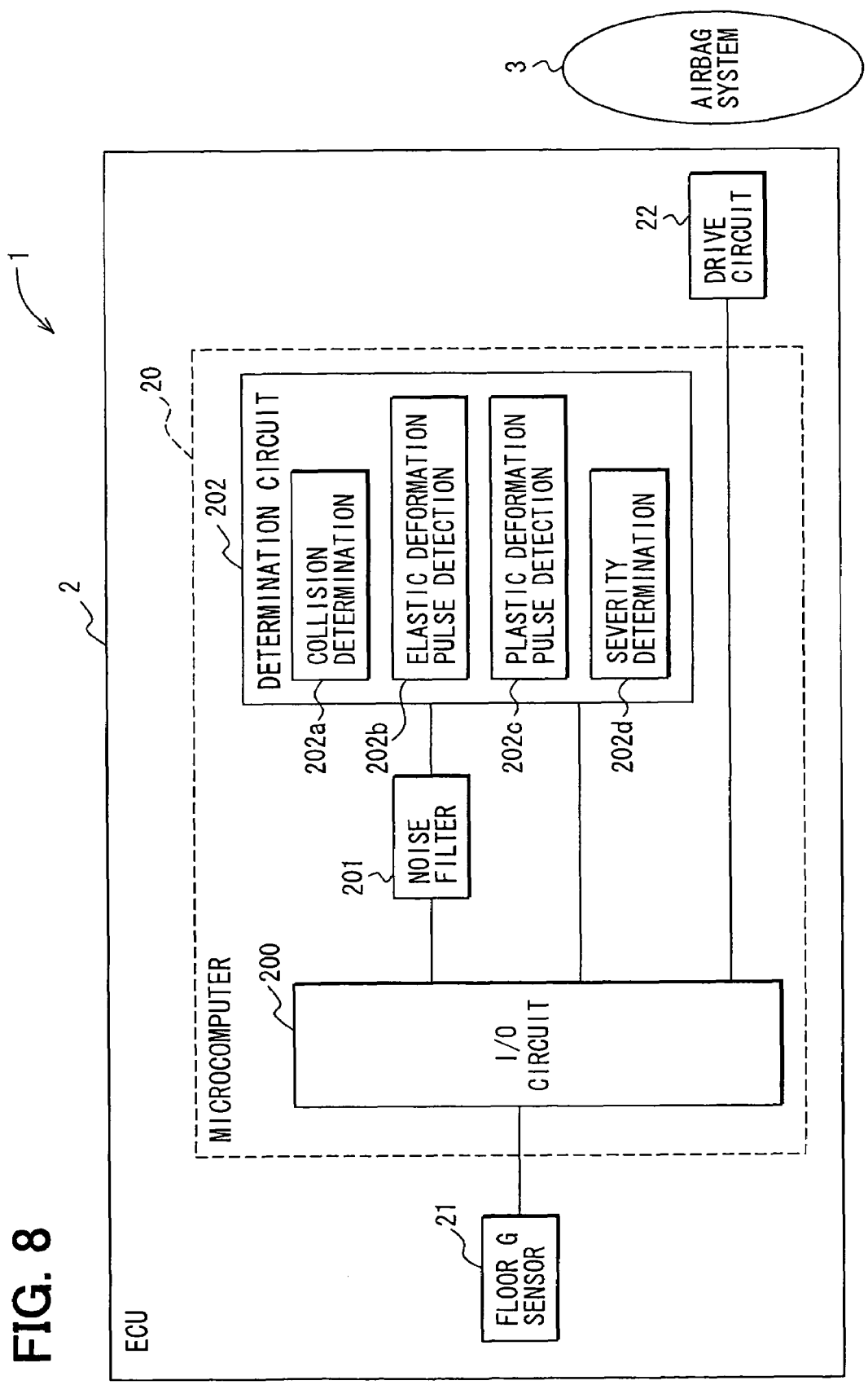
FIG. 8 is a block diagram of the passive safety system according to the embodiment.

Referring to FIG. 7, A passive safety system 1 includes an electronic control unit (ECU) 2 and an airbag system 3. The ECU 2 is fixedly arranged below an instrument panel 92 and above a floor tunnel (not shown). The ECU 2 includes a microcomputer 20 and a floor G sensor 21. The floor G sensor 21 is an acceleration sensor and forms a determination device together with the microcomputer 20. The microcomputer 20 includes an I/O circuit 200, a noise filter 201, and a determination circuit 202. The determination circuit 202 includes a collision determination section 202a, an elastic deformation pulse detection section 202b, a plastic deformation pulse detection section 202c, and a severity determination section 202d.

One of the airbag systems 3 is disposed in the center of the steering wheel 93 and inside the steering wheel 93 and another airbag system 3 is disposed inside the instrument panel 92 on the passenger's side. Each airbag system 3 includes two inflators (not shown) and an airbag (not shown). The airbag system 3 inflates the airbag to two different levels of pressures depend on the severity of collision.

The severity determination section 202d determines the severity based on the first peak of the plastic deformation pulse that appears immediately after a collision. The first peak appears in the plastic deformation pulse immediately after a collision as shown in FIG. 4B indicated with a dashed-line circle A. The first peak appears earlier as the vehicle speed increases. The first peak appears earlier than the second peak that is indicated with a dashed-line circle B in FIG. 4A. Thus, the airbag system 3 can be promptly actuated when the severity is determined based on the first peak.

To properly protect an occupant from injury in an accident, the airbag system 3 is required to be actuated in a predetermined time. Therefore, an actuation signal that requests actuation of the airbag system 3 must be transmitted to the airbag system 3 within an actuation request time, which is a predetermined period after the first impact on the vehicle in a collision. For example, the actuation request time is set to a time between a time at which the first peak appears and a time at which the second peak appears as indicated with a dashed line in FIG. 4B. In this case, the airbag system 3 is properly actuated because the severity determination section 202d determines the severity of the collision based on the first peak.

The first peak appears when bumper reinforcements or front parts of side frames are damaged. Since the appearances of the peaks differ from a vehicle to a vehicle due to their structures, peaks other than the first and the second peaks can be used for the severity determination as long as those peaks have correlation between them.

The plastic deformation pulse detection section 202c calculates the first average acceleration G1 of the plastic deformation pulse for a predetermined time interval. The elastic deformation pulse detection section 202b calculates the second average acceleration G2 of the elastic deformation pulse for a predetermined time interval. The severity determination section determines the severity using a weighting factor, which is expressed by the following equation:

$$W1=G1/G2$$

Figure 5:
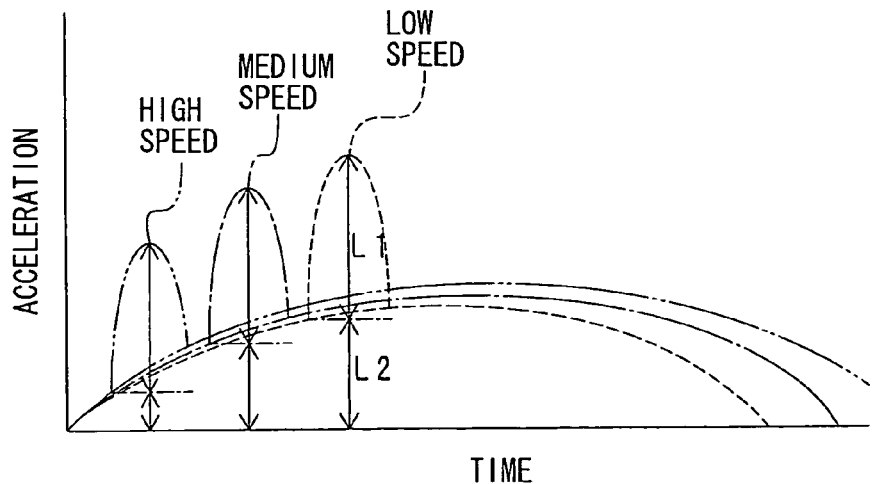
FIG. 5 is a schematic diagram of the acceleration waveforms at the time of collisions.

A schematic diagram of acceleration waveforms produced at the time of a collision is shown in FIG. 5. A ratio between an amplitude L1 of a peak of the plastic deformation pulse and an amplitude L2 of the elastic deformation pulse corresponding to the peak of the plastic deformation pulse is expressed as L1/L2. The ratio becomes larger as the vehicle speed increases. A ratio between the average accelerations G1 and G2, that is, the weighting factor WI also becomes larger as the vehicle speed increases. The plastic deformation pulse becomes more distinguishable by using the weighting factor W1. Therefore, the severity determination becomes easier.

Figure 6:
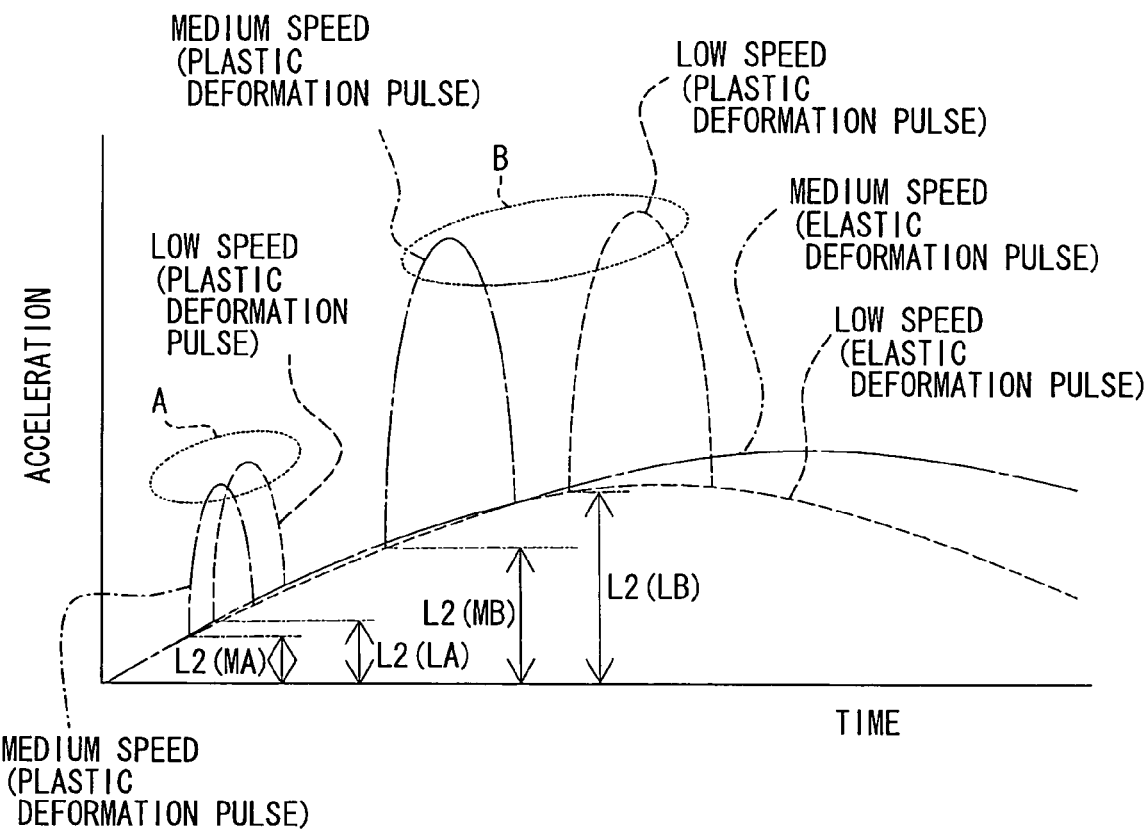
FIG. 6 is an enlarged view of the acceleration waveforms shown in FIG. 4A around the first and the second peaks.

A time difference DA between the first peaks of different acceleration speed waveforms is smaller than a time difference DB between the second peaks of those waveforms as shown in FIG. 4A. An enlarged view of those waveforms around the first and the second peaks is shown in FIG. 6. Since the time difference DB is larger than the time difference DA, a difference between an amplitude L2 (LB) of the elastic pulse of the low speed waveform and an amplitude L2 (MB) of the elastic pulse of the medium speed waveform is large at the second peaks with respect to the first peaks. As a result, the vehicle speed is easily determined based on the second peaks.

A difference between an amplitude L2 (LA) of the elastic deformation pulse of the low speed waveform and an amplitude L2 (MA) of the elastic deformation pulse of the medium speed waveform is small at the first peaks with respect to the second peaks. Thus, the vehicle speed is not easily determined based on the first peaks. However, the severity determination section 202d corrects the plastic deformation pulse with the weighting factor W1 and obtains the amplified first peak. Therefore, the severity determination section 202d can properly determines the vehicle speed, that is, the severity. The weighting factor W1 can be used by itself or can be used with another parameter, for example, a value calculated by multiplying the weighting factor W1 by the other parameter.

The severity determination section 202d determines the severity using a severity operator SV1. The severity operatorg SV1 is calculated by multiplying the weighting factor W1 by one of an acceleration sensor output, the first average acceleration G1, and the second average acceleration G2. With this configuration, the severity can be easily and properly determined even when the first peak is used for the determination. It is preferable to use the severity operator that is expressed by the following equation:

$$SV1=W1\times G1$$

It is further preferable that the severity determination section 202d uses another weighting factor W2 expressed by the following equation:

$$W2=|G1-G2|/G2$$

By using the weighting factor W2, the first peak is amplified. Thus, the vehicle speed, that is, the severity is properly determined even when the first peak is used for the determination.

When the second average acceleration G2 is higher than a predetermined threshold, it is preferable to use another severity operator SV2 expressed by the following equation:

$$SV2=W2\times|G1-G2|$$

By using the severity operator SV2, the first peak is amplified. Thus, the vehicle speed, that is, the severity is properly determined even when the first peak is used for the determination.

When the second average acceleration G2 is lower than a predetermined threshold, it is preferable to use another severity operator SV3 expressed by the following equation:

$$SV3=|G1-G2|$$

By using the severity operator SV3, the airbag system 3 is properly operated at a low severity level when the vehicle speed is low.

Figure 9:
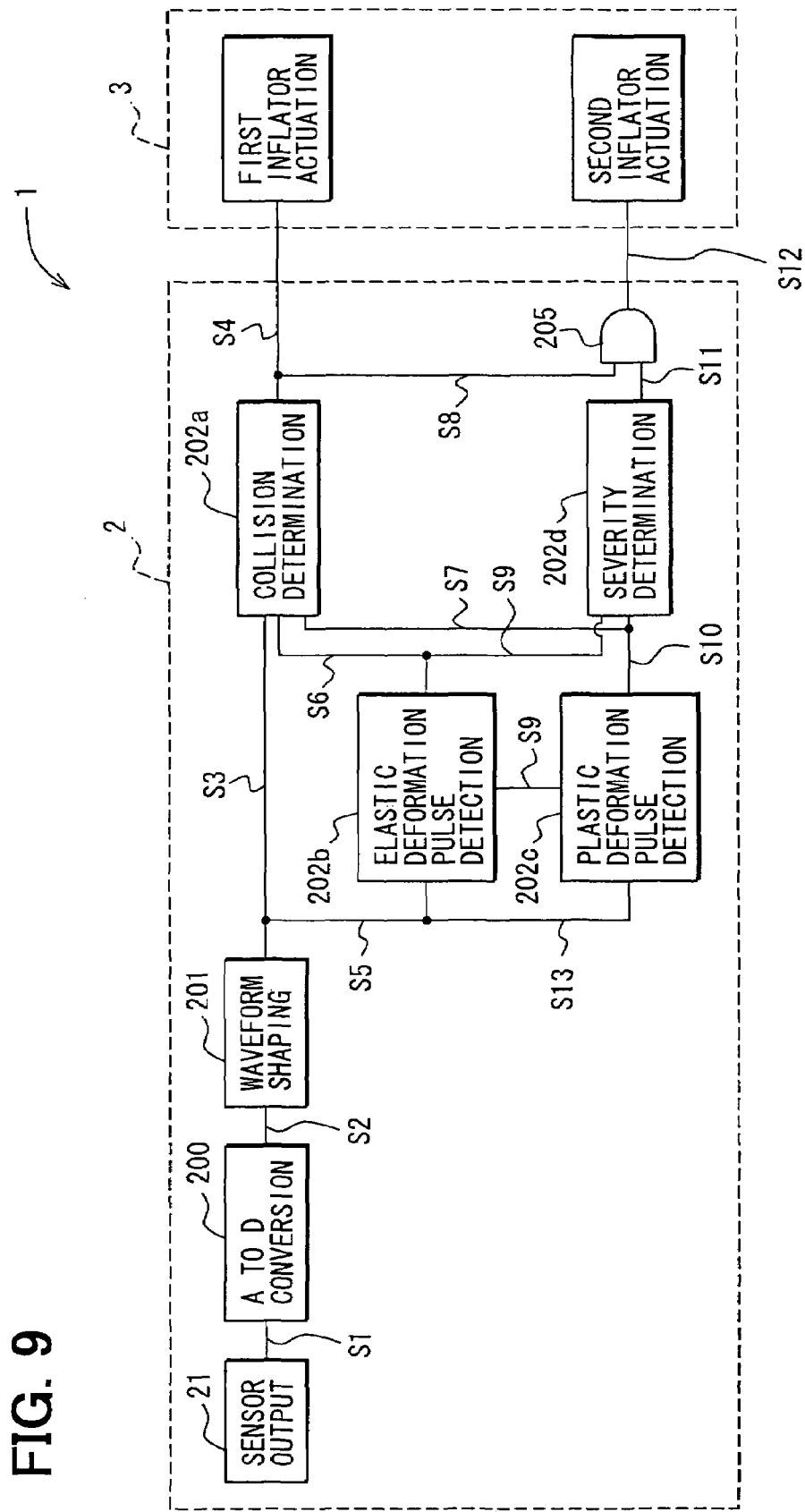
FIG. 9 is a flowchart of operation performed by the passive safety system and indicated with a block diagram of an ECU and an airbag system included in the passive safety system according to the embodiment.

Operation of the passive safety system 1 in the event of a collision will be discussed in detail referring to FIG. 9. Output data containing an acceleration waveform of the floor G sensor 21 is transmitted to the I/O circuit 200 via a signal line S1. The acceleration waveform is converted into digital form by the I/O circuit 200. The converted acceleration waveform is transmitted to a noise filter 201 via a signal line S2. The converted acceleration waveform is shaped by the noise filter 201. The shaped acceleration waveform is transmitted to the collision determination section 202a via a signal line S3. The shaped acceleration waveform is also transmitted to the elastic deformation pulse detection section 202b via a signal line S5.

The elastic deformation pulse detection section 202b has a low pass filter (not shown) with a cut off frequency of 6 to 7 Hz. A frequency of the elastic deformation pulse is lower than that of the plastic deformation pulse. Therefore, the elastic deformation pulse detection circuit 202b uses the low pass filter for separating an elastic deformation pulse component from the shaped acceleration waveform for detecting the elastic deformation pulse. The elastic deformation pulse detection section 202b calculates the second average acceleration G2 during a time interval between −30 ms and 0 ms. It calculates the second average acceleration G2 from an elastic deformation pulse $G_E(t)$ detected by the elastic deformation pulse detection section 202b using the following equation:

$$G2 = \frac{\int_0^{-30ms} G_E(t)dt}{30\ ms}$$

The elastic deformation pulse detection section 202b performs an interval integration on the elastic deformation pulse $G_E(t)$ for a time interval between −30 ms and 0 ms. The second average acceleration G2 is calculated by dividing the result of the interval integration by the time interval. The detected elastic deformation pulse is transmitted to the collision determination section 202a via a signal line S6. The second average acceleration G2 is also transmitted to the severity determination section 202d via a signal line S9.

The shaped acceleration waveform is also transmitted to the plastic deformation pulse detection section 202c via a signal line S13. The plastic deformation pulse detection section 202c is provided with a high pass filter (not shown) with a cut off frequency of 60 to 70 Hz. The plastic deformation pulse detection section 202c detects a plastic deformation pulse by separating a plastic deformation pulse component from the acceleration waveform for detecting the plastic deformation pulse. The plastic deformation pulse is detected by filtering the acceleration waveform with the high pass filter because a frequency of the plastic deformation pulse is higher than that of the elastic deformation pulse. The plastic deformation pulse detection section 202c calculates the first average acceleration G1 for a time interval between −10 ms and 0 ms from the detected plastic deformation pulse $G_p(t)$ using the following equation:

$$G1 = \frac{\int_0^{-10ms} G_P(t) dt}{10 \text{ ms}}$$

The plastic deformation pulse detection section 202c performs an interval integration on the plastic deformation pulse. $G_p(t)$ for a time interval between −10 ms and 0 ms. It calculates the first average acceleration G1 by dividing the result of the interval integration by the time interval (−10 ms to 0 ms). The detected plastic deformation pulse is also transmitted to the collision determination section 202a via a signal line S7. The first average acceleration G1 is transmitted to the severity determination section 202d via a signal line S10.

Figure 10A:
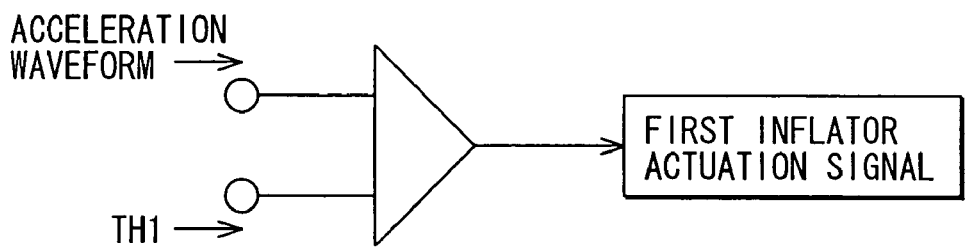
FIGS. 10A is a schematic diagram showing operation of a comparator in a collision determination section of a determination circuit included in the passive safety system according to the embodiment.
Figure 10B:
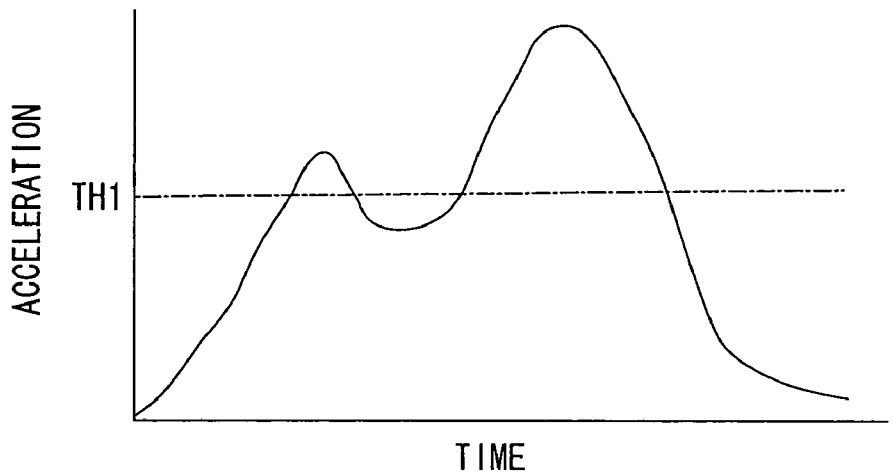
FIG. 10B is a graph showing the acceleration waveform and a threshold used for collision determination according to the embodiment.
Figure 12:
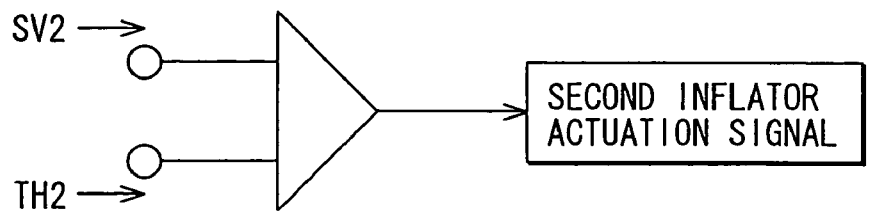
FIG. 12 is a schematic diagram showing operation of a comparator in the severity determination section of the determination circuit according to the second embodiment.

The collision determination section 202a receives the acceleration waveform, the elastic deformation pulse, and the plastic deformation pulse. A collision threshold TH1 is stored in a ROM (not shown) in advance. The collision threshold TH1 is used as a reference in determination of necessity of actuation of the airbag system 3. The collision determination section 202a receives the acceleration waveform that is corrected by the elastic deformation pulse and the plastic deformation pulse. As shown in FIG. 10A, a comparator of the collision determination section 202a compares the corrected acceleration waveform with the collision threshold TH1. If a part of the acceleration waveform is above the collision threshold TH1 as shown in FIG. 10B, an actuation signal that requests actuation of the first inflator is transmitted to the airbag system 3 via the signal line S4. The actuation signal is also transmitted to an AND gate 205 via a signal line S8.

The severity determination section 202d receives the first average acceleration G1 and the second average acceleration G2. The severity determination section 202d calculates a weighting factor W2 using the following equation:

$$W2 = \frac{|G1 - G2|}{G2}$$

The severity determination section 202d calculates a severity operator SV2 using the following expression:

$$SV2 = W2 \times |G1 - G2|$$

Figure 11A:
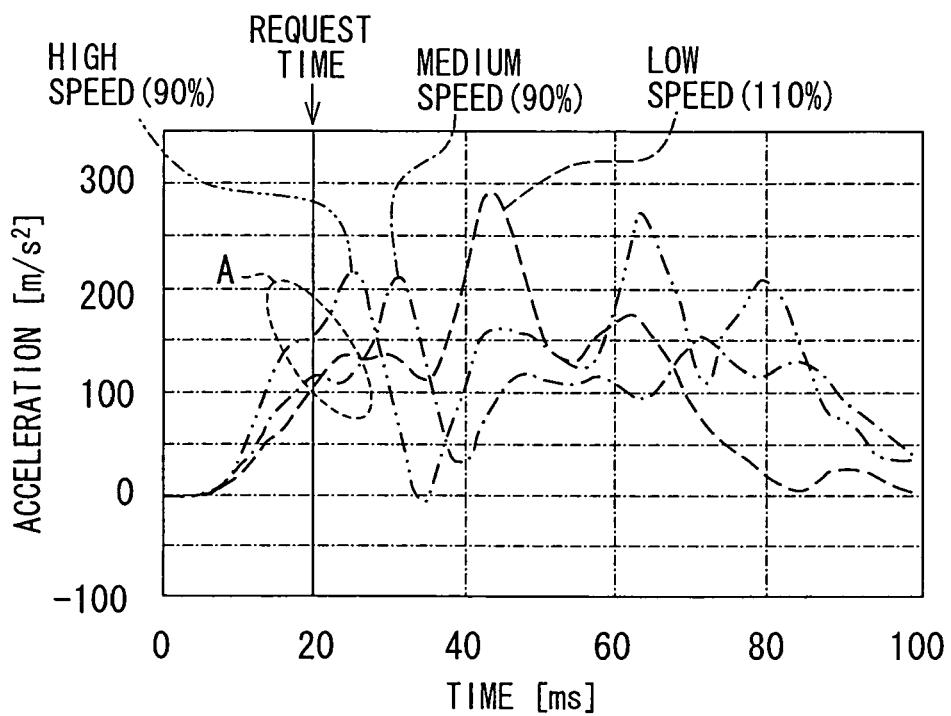
FIG. 11A is acceleration waveforms with 10% safety margins at the time of collisions.
Figure 11B:
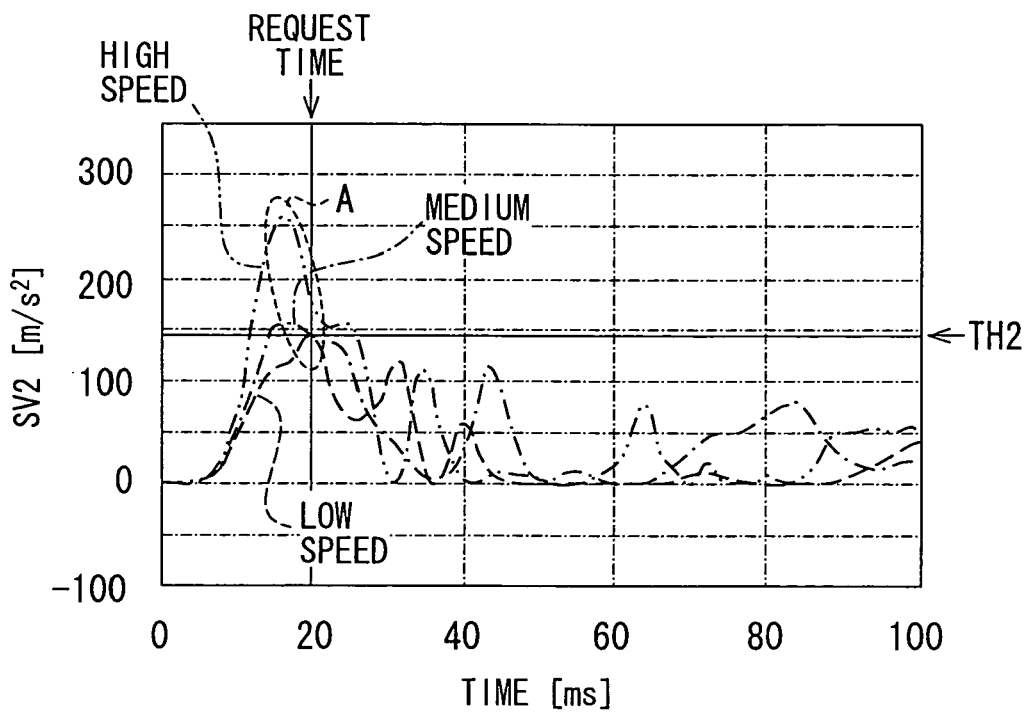
FIG. 11B is waveforms of severity operators.

The acceleration waveforms with safety margins produced at the time of collisions and waveforms of the severity operators are shown in FIGS. 11A and 11B, respectively. Peaks of the plastic deformation pulses that appear immediately after the first impact on the vehicle become more significant when the acceleration waveforms are expressed with the severity operator SV2 as shown in FIG. 11B. As a result, the first peaks of the severity operator waveforms in a dashed-line circle A shown in FIG. 11B are higher than the first peaks of the acceleration waveforms in a dashed-line circle A shown in FIG. 11A.

A severity threshold TH2 is stored in the ROM in advance.

The severity threshold TH2 is used as a reference in determination of necessity of transmission of an actuation signal that requests actuation of the second inflator. A comparator of the severity determination section 202d compares the severity operator SV2 with the severity threshold TH2. If a part of the severity operator SV2 is above the severity threshold TH2 as shown in FIG. 11B, the actuation signal is transmitted to the AND gate 205 via the signal line S11.

Namely, the actuation signal is transmitted to the AND gate 205 when the vehicle speed is medium or high. However, the actuation signal is not transmitted to the AND gate 205 when the vehicle speed is low.

The AND gate 205 receives the first actuation signal that requests actuation of the first inflator via the signal line S8, and the second actuation signal that requests actuation of the second inflator via the signal line S11. It outputs an actuation signal that requests actuation of the second inflator to the airbag system 3 via a signal line S12 when received both the first and second actuation signals.

The speed of the vehicle 9 and the plastic deformation pulse have a proportional relationship. The speed of the vehicle 9 and the timing of occurrence of the peak of the plastic deformation pulse with respect to the elastic deformation pulse have a proportional relationship. The passive safety system 1 determines the severity of collision based on such relationships. Thus, the severity is reliably determined.

The passive safety system 1 determines the severity based on the first peaks of the acceleration waveforms. Therefore, the severity determination is performed and an actuation signal is transmitted to the airbag system 3 when high severity is determined before an actuation request time of the airbag system 3, which is, for example, 20 ms, has elapsed.

The collision determination section 202a receives not only the acceleration waveform but also the elastic deformation pulse and the plastic deformation pulse. Thus, the collision determination is performed with high accuracy.

The floor G sensor 21 and the determination circuit 202 are modularized and disposed in the ECU 2. Thus, they do not take much mounting space in comparison with a device in which an acceleration sensor and a determination circuit are distantly arranged. Furthermore, the floor G sensor 21 and the determination circuit 202 can be shared among other models of vehicles.

The floor G sensor 21 is less likely to be damaged in the event of an accident since the ECU 2 is fixedly arranged below the instrument panel 92 and above the floor tunnel. Therefore, the severity determination is properly performed regardless of a degree of impact of the collision.

An actuation signal that requests actuation of the first inflator is transmitted to the AND gate 205 via the signal line S8. Thus, the second inflator will not be actuated before the actuation of the first inflator. Moreover, only one sensor 21 is required for the determination of the severity and the airbag system 3 is operated according to the severity determined based on outputs of the single sensor 21.

The present invention should not be limited to the embodiment previously discussed and shown in the figures, but may be implemented in various ways without departing from the spirit of the invention. For example, the ECU 2 can be used for a seatbelt pretensioner system for tightening a seatbelt according to the severity of collision in the event of an accident.

The passive safety system 1 or the ECU 2 may be separately used with an existing passive safety system. Specifically, a collision is determined based on acceleration waveforms outputted from a satellite sensor 91 arranged the front or the sides of the vehicle 9 as shown in FIG. 7 and from the floor G sensor 21. Then, the severity of the collision is determined based on the acceleration waveform outputted from the floor G sensor 21. The cut off frequency of the low pass filter or the high pass filter can be set to any frequency; for example, it can be set to a frequency between 5 Hz and 10 Hz. Any technique to obtain the similar results produced by the low-pass filter or the high-pass filter, such an interval integration and interval differentiation, can be used.

Either the low pass filter or the high pass filter may be removed. If the low pass filter is removed, the high pass filter is used to detect a plastic deformation pulse. An elastic deformation pulse is detected based on a difference between acceleration waveform and the plastic deformation pulse. If the high pass filter is removed, the low pass filter is used to detect an elastic deformation pulse. A plastic deformation pulse is detected based on a difference between the acceleration waveform and the elastic deformation pulse. The number of parts can be reduced by removing one of the low pass filter and the high pass filter.

The average accelerations G1 and G2 are calculated by sampling accelerations for several times during a predetermined time interval and dividing the sum of the sampled accelerations by the number of times of sampling. The airbag may be inflated at different levels of pressures in multiple steps or a single step.

What is claimed is:

1. A determination device for a passive safety device that operates according to severity of a collision in a vehicle accident comprising:
   a single acceleration sensor configured to measure an acceleration of a vehicle to provide an acceleration wave form; and
   a determination circuit that includes a plastic deformation pulse detection section, an elastic deformation pulse detection section, and a severity determination section, wherein
   the determination circuit is electrically connected with the acceleration sensor;
   the plastic deformation pulse detection section is configured to detect a plastic deformation pulse by separating a plastic deformation pulse component having a first frequency range that is caused by damage of individual parts of the vehicle from the acceleration waveform;
   the elastic deformation pulse detection section is configured to detect an elastic deformation pulse by separating an elastic deformation pulse component having a second frequency range that is caused by damage of the entire vehicle to be lower than the first frequency range from the acceleration waveform;
   the severity determination section is configured to determine the severity of a collision based on a correlation between a vehicle speed, the plastic deformation pulse, and the elastic deformation pulse;
   the plastic deformation pulse detection section is configured to calculate a first average acceleration of the plastic deformation pulse in a predetermined time interval;
   the elastic deformation pulse detection section is configured to calculate a second average acceleration of the elastic deformation pulse in a predetermined time interval;
   the severity determination section is configured to calculate a weighting factor by dividing an absolute value of the first average acceleration minus the second average acceleration by the second average acceleration; and
   the severity determination section determines the severity of a collision using the weighting factor.

2. The determination device according to claim 1, wherein:
   the severity determination section calculates a severity operator by multiplying the weighting factor by the absolute value when the second average acceleration is higher than a predetermined threshold; and
   the severity determination section determines the severity of a collision by comparing the severity operator with a threshold value.

3. The determination device according to claim 1, wherein:
   the plastic deformation pulse detection section further includes a high pass filter having a cutoff frequency of 60 Hz to 70 Hz configured for separating the plastic deformation pulse component with the high pass filter.

4. The determination device according to claim 1, wherein:
   the elastic deformation pulse detection section further includes a low pass filter having a cutoff frequency of 5 Hz to 10 Hz configured for separating the elastic deformation pulse component.

5. The determination device according to claim 1, wherein the acceleration sensor and the determination circuit are arranged in a module.

6. The determination device according to claim 5, wherein the module is arranged in about a middle of a side-to-side line of the vehicle.

* * * * *